United States Patent [19]
Kawabata et al.

[11] Patent Number: 5,618,984
[45] Date of Patent: Apr. 8, 1997

[54] PHENOL ARALKYL RESINS, PREPARATION PROCESS THEREOF AND EPOXY RESIN COMPOSITIONS

[75] Inventors: Tomoyuki Kawabata; Teruo Yuasa, both of Aichi-ken; Shigeru Iimuro, Kanagawa-ken, all of Japan

[73] Assignee: Mitsui Toatsu Chemicals, Inc., Tokyo, Japan

[21] Appl. No.: 490,507

[22] Filed: Jun. 14, 1995

[30] Foreign Application Priority Data

Jun. 24, 1994 [JP] Japan .................................. 6-142808

[51] Int. Cl.$^6$ .................... C07C 39/21; C07C 37/055
[52] U.S. Cl. ................... 569/720; 523/400; 568/640; 568/718
[58] Field of Search ........................... 568/718, 720

[56] References Cited

U.S. PATENT DOCUMENTS

| 4,978,810 | 12/1990 | Kanayama et al. | 568/718 |
| 5,087,766 | 2/1992 | Kanayama et al. | 568/718 |

FOREIGN PATENT DOCUMENTS

| 236933 | 9/1987 | European Pat. Off. . |
| 388145 | 9/1990 | European Pat. Off. . |
| 297826 | 10/1983 | Germany . |
| 3-174428 | 7/1991 | Japan . |
| 4-23824 | 1/1992 | Japan . |
| 4-4212 | 1/1992 | Japan . |

OTHER PUBLICATIONS

Patent Abstracts Of Japan, C Section, vol. 6, No. 144, Apr. 10, 1992, *The Patent Office Japanese Government*, p. 144, C 927 and JP-A-4-004,212.

*Primary Examiner*—Joseph E. Evans
*Attorney, Agent, or Firm*—Burns, Doane, Swecker & Mathis

[57] ABSTRACT

An allyletherificated phenol aralkyl resin is obtained through the reaction of a phenol aralkyl resin with an allyl halide in the presence of a base in an organic solvent at room temperature to 100° C. and changed into an allylated phenol aralkyl resin at 160°–250° C. through Claisen rearrangement. The two resins are low in melt viscosity. Epoxy resin compositions containing the allylated phenol aralkyl resin as the curing agent give cured products being excellent in heat and moisture resistances.

3 Claims, 2 Drawing Sheets

PHENOL ARALKYL RESINS, PREPARATION PROCESS THEREOF AND EPOXY RESIN COMPOSITIONS

BACKGROUND OF THE INVENTION

1. Field of the Invention

The present invention relates to phenol aralkyl resins, preparation processes thereof and epoxy resin compositions containing allylated phenol aralkyl resins. Particularly it relates to allyletherificated phenol aralkyl resins, allylated phenol aralkyl resins, preparation processes thereof and epoxy resin compositions containing allylated phenol aralkyl resins.

2. Prior Art

Allyletherificated phenol resins and allylated phenol resins obtained through the reaction of a phenol with an allyl halide are known. They are generally used as curing agents for epoxy and maleimide resins. JP-A-04-023824/1992 (Tokkaihei) discloses a resin composition containing a polyallylphenol as a curing agent for epoxy resins.

Cured products containing the known allylated phenol resins are excellent in intensity and rigidity at normal and high temperatures and their price is relatively inexpensive and stable in the market. However, they are apt to absorb relatively large amounts of moisture and are inferior in mechanical properties under high humidity conditions.

JP-A-04-004212/1992 (Tokkaihei) discloses an allylated product of phenol-aromatic hydrocarbon resin. The product is a constituent of a resin composition for sealing semiconductors and the resin composition is improved in moisture absorbability and low stress properties. However, it discloses neither an allyletherificated phenol aralkyl resin, nor an allylated phenol aralkyl resin, nor preparation processes thereof. A mixed solvent consisting of water and acetone is used in the examples, and the resulting resins are copolymers in which allyletherification and allylation of phenol nucleus proceed at the same time. Optionally, an allyletherificated phenol aralkyl resin is not obtained under the condition, nor is an allylated phenol aralkyl resin.

The above-mentioned copolymers are allylated phenol-aromatic hydrocarbon resin composition represented by the following formula,

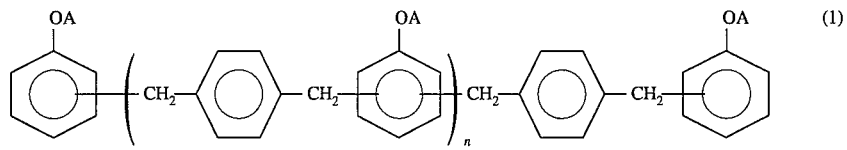

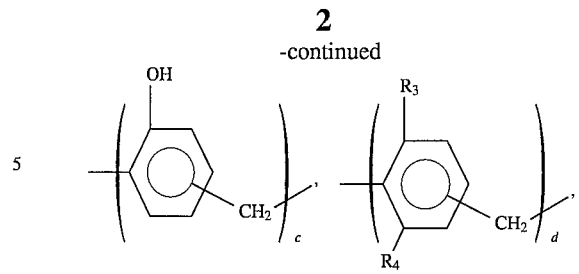

wherein $R_3$ and $R_4$ are hydrogen atoms or a methyl group, $0 < a, b, c, d < 100$ and $a+b+c+d=100$ a, b, c and d in the formula each stand for the percentage of the resin constituents.

With the marked advancement of technology in electric and electronic fields, there has been a demand for a resin which can ensure excellent qualities even when it is used in a small amount. For example, in the field of IC sealing materials, there is a demand for a resin which has excellent molding and processing properties, and a low viscosity so that it can be used as a filler with high filling capability. It is important to reduce viscosity while retaining the required heat and moisture resistant properties.

SUMMARY OF THE INVENTION

There is a great demand for allyletherificated phenol aralkyl resins and allylated phenol aralkyl resins which have a low viscosity, and preparation processes thereof, and epoxy resin compositions which provide cured products having excellent heat and moisture resistances.

The present inventors earnestly studied to solve the above-mentioned problems and found that the problems can be solved by reacting a phenol aralkyl resin with an allyl halide in the presence of a base in an organic solvent to obtain an allyletherificated phenol aralkyl resin and changing it through Claisen rearrangement to obtain an allylated phenol aralkyl resin.

A general object of the present invention is to provide an allyletherificated phenol aralkyl resin represented by the general formula (1),

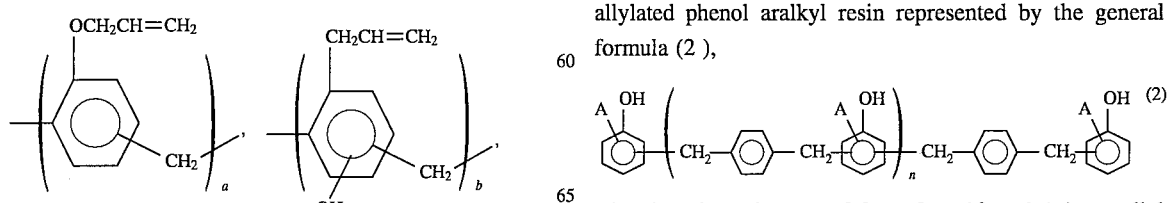

wherein n is an integer of from 0 to 10 and A is an allyl group.

Another object of the present invention is to provide an allylated phenol aralkyl resin represented by the general formula (2), wherein n is an integer of from 0 to 10 and A is an allyl group.

Still another object of the present invention is to provide a process for preparing an allyletherificated phenol aralkyl resin which comprises reacting an allyl halide with a phenol aralkyl resin represented by the general formula (3),

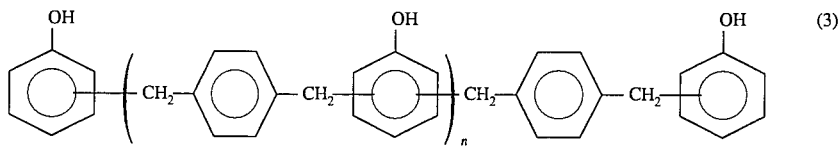

wherein n is an integer of from 0 to 10, in the presence of a base in an organic solvent.

A further object of the present invention is to provide a process for preparing an allylated phenol aralkyl resin which comprises reacting an allyl halide with a phenol aralkyl resin represented by the general formula (3),

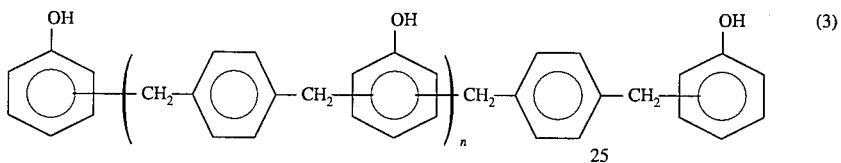

wherein n is an integer of from 0 to 10, in the presence of a base in an organic solvent to obtain an allyletherificated phenol aralkyl resin, and changing the allyletherificated phenol aralkyl resin through Claisen rearrangement.

A still further object of the present invention is to provide an epoxy resin composition comprising an epoxy resin and an allylated phenol aralkyl resin.

The phenol aralkyl resins of the present invention have a lower melt viscosity than a conventional phenol aralkyl resin (Comparative Example 1). When a cured product containing a resin of the present invention (Example 1) and cured products containing a conventional phenol aralkyl resin (Comparative Example 1) or a conventional allylated novolak type phenol resin (Comparative Example 2) have equal glass transition temperatures with one another, the cured products containing the resin of the present invention (Example 1) have a lower water absorption than the others. When the curing reaction of an epoxy resin composition is carried out using a resin of the present invention, the number of troubles such as a crack in a molding product is reduced. The resins are useful as intermediates of epoxy resins for IC sealing materials, laminate materials, heat resistant adhesives, paints and resists, molding materials, and curing agents of epoxy and maleimide resins.

This is because the allylated phenol aralkyl resin has a special chemical-constructure property and the phenol constituents link together through the aralkyl group contributing to heat and moisture resistances of cured products as understood from the viewpoint of structure, compared with conventional novolak type phenol resins.

BRIEF DESCRIPTION OF DRAWINGS

In FIGS. 2 and 4, integers of 0 to 3 represent moieties in the resin whose repeating unit numbers are of 0 to 3, respectively.

DESCRIPTION OF THE PREFERRED EMBODIMENT

Preparation Process of Phenol Aralkyl Resins

Figure 1:
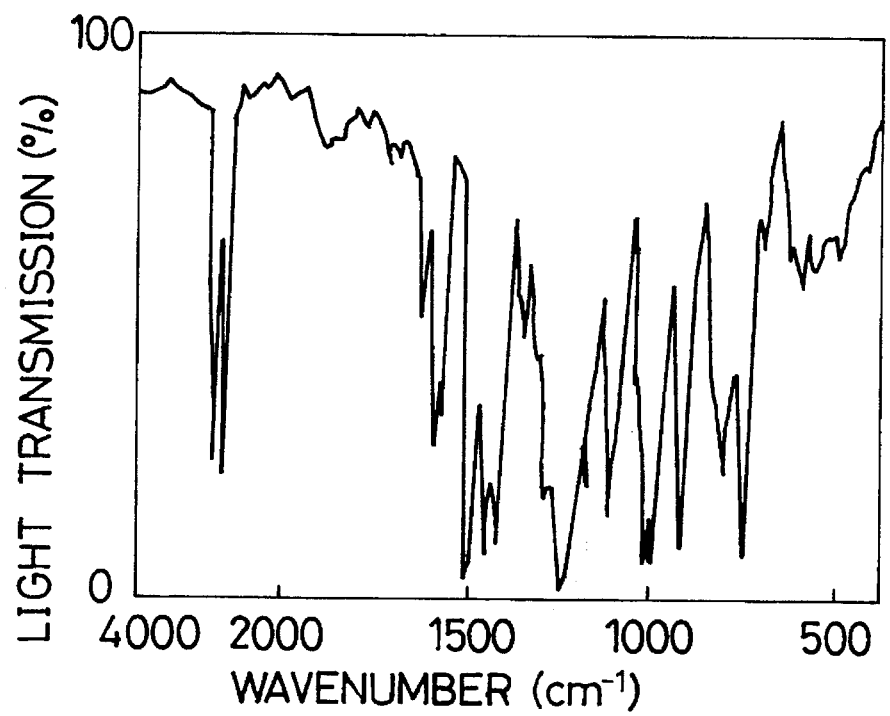
FIG. 1 is an infrared absorption spectrum of the allyletherificated phenol aralkyl resin in example 1.

Phenol aralkyl resins are condensation resins through the Friedel-Crafts reaction of a phenol with an aralkyl compound and are called Friedel-Crafts resins.

They are obtained through the process of adding from 1.0 to 4.0 moles, preferably 1.5 to 3.5 moles, of phenol compound per mole of aralkyl compound, heating up the resulting mixture as it is in the presence of an acidic catalyst and reacting them at the temperature given below. After completion of the reaction, unreacted phenol remains as expected and the phenol is removed under vacuum pressure to obtain a phenol aralkyl resin.

The phenol compounds in the reaction may be any of compounds containing phenolic hydroxyl groups and include phenol, alkyl-substituted phenols such as o-, p- and m-cresols and p-tert-butyl phenol and aromatic group-substituted phenols such as p-phenylphenol.

The aralkyl compounds in the reaction are aromatic compounds which contain bifunctional groups which make it possible to carry out condensation additions such as halomethyl, hydroxymethyl and alkoxymethyl groups. They include dihalomethyl aromatic compounds such as $\alpha,\alpha'$-dichloro-p-xylene, dihydroxymethyl aromatic compounds such as p-xylylene glycol, and dialkoxymethyl aromatic compounds such as $\alpha,\alpha'$-dimethoxy-p-xylene and $\alpha,\alpha'$-diethoxy-p-xylene.

The catalyst includes inorganic compounds such as stannic chloride, zinc chloride, ferric chloride, cupric chloride, cupric sulfate, mercurous sulfate, mercuric sulfate, mercurous chloride, mercuric chloride, silver sulfate, silver chloride and sodium hydrogen sulfate; sulfuric acid; sulfuric acid compounds such as monoethylsulfuric acid, dimethylsulfuric acid and diethylsulfuric; and organic sulfonic acids such as p-toluenesulfonic acid, p-phenolsulfonic acid and methanesulfonic acid. The compounds may be used alone or in combination. The amount of the catalyst is from 0.01 to 5% by weight on the basis of the total weight of the phenol compound and the aralkyl compound.

The reaction temperature is generally not less than 110° C. This is because if it is less than 110° C., the reaction proceeds at an extremely low rate. Moreover, the temperature is desirably from about 130° to 240° C. in order to reduce the reaction time. The time is usually from 1 to 20 hours.

In addition, an organic solvent which has a relatively high boiling point may be used if necessary. The organic solvent includes alcohols such as methanol, ethanol, n-propanol, isopropanol, n-butanol and tert-butanol; and aromatic compounds such as toluene, xylene and mesitylene.

Preparation Process of Allyletherificated Phenol Aralkyl Resins

An allyletherificated phenol aralkyl resin whose base resin is a phenol aralkyl resin obtained according to the above-mentioned procedures, can be obtained through the known process of allylating phenols.

A phenol aralkyl resin as a base resin is dissolved in an organic solvent. A base is added into the mixture, and an allyl halide such as allyl chloride, allyl bromide and allyl iodide is added into it. The reaction is carried out at from room temperature to 100° C. for 1 to 5 hours to obtain an allyletherificated phenol aralkyl resin.

The organic solvent includes alcohols such as n-propanol, 2-propanol and n-butanol; ketones such as acetone and methyl ethyl ketone; and aprotic polar solvents such as dimethyl sulfoxide and N,N-dimethylformamide. The product yield depends upon the type of organic solvent but the reaction usually proceeds at a reaction rate more than or equal to 95% when the above-mentioned solvent is used. The organic solvent depends upon the intended use of the resin. An organic solvent may be used when a phenol aralkyl resin and a product are soluble in the organic solvent, and a base neither decomposes the solvent nor reacts with it. Alcohols such as 2-propanol are preferred.

The base includes alkali metal hydroxides such as potassium hydroxide and sodium hydroxide. The amount of the alkali metal hydroxide is from 1.0 to 3.0 equivalent weights per equivalent weight of the phenolic hydroxy group to be allylated. From 1.0 to 1.2 equivalent weights of base is preferred.

The amount of allyl halide is at least 1 equivalent weight per equivalent weight of base.

Preparation Process of Allylated Phenol Aralkyl Resins

An allylated phenol aralkyl resin is obtained through the process of heating an allyletherificated aralkyl resin up to a temperature of from about 160° to 250° C., preferably about 180° to 200° C., and rearranging allyl groups in the form of ether linkage.

Epoxy Resin Compositions

An epoxy cured product is obtained by treating an epoxy resin composition consisting of the above-mentioned allylated phenol aralkyl resin and an epoxy resin in the presence of a curing accelerator at a temperature of from 100° to 250° C.

The epoxy resin may be any of compounds containing more than 2 epoxy groups per molecule. Epoxy resins include bisphenol A type epoxy resins, bisphenol F type epoxy resins, phenol novolak type epoxy resins, cresol novolak type epoxy resins, glycidyl ether type epoxy resins such as tetramethylbiphenyl type epoxy resins, and alicyclic epoxy resins such as (3',4'-epoxycyclohexylmethyl)-3,4-epoxycyclohexane carboxylate. These epoxy resins may be used alone or in combination.

The amount of allylated phenol aralkyl resin is from 20 to 250 parts by weight, preferably 30 to 200 parts by weight, per 100 parts by weight of epoxy resin.

The curing accelerator includes organic phosphine compounds such as triphenylphosphine, imidazole compounds such as 2-ethyl-4-methylimidazole, and bicyclic nitrogen-containing compounds such as 1,8-diazabicyclo(5,4,0)undeca-7-ene. The amount is from 0.01 to 5% by weight, preferably 0.05 to 1% by weight, based on the total weight of allylated phenol aralkyl resin and epoxy resin.

In addition, fillers such as silica, alumina, talc and clay, flame retardants such as antimony trioxide, colorants such as carbon black, and flexibilizers such as acrylonitrile-butadiene rubber and silicone oil, may be added as needed.

EXAMPLES

The present invention will be explained below in detail by way of examples and comparative examples. In the following examples and comparative examples, evaluation and determination of various characteristic properties were carried out according to the following methods (1) to (5).

(1) Viscosity

The viscosity of each resin was determined at 80° C. using ICI Cone & Plate Type Viscometer (available from Research Equipment Co., London).

(2) Glass Transition Temperature (Tg)

The Tg value of each cured product was evaluated through the determination of linear thermal coefficient of expansion using TMA 8146 available from Rigaku Co. according to thermomechanical Analysis.

(3) Infrared Absorption Spectrum Analysis (IR analysis)

IR analysis of each resin was carried out using apparatus FT-IR 4200 from Shimadzu Seisakusho Co.

(4) Gel Permeation Chromatography (GPC) Analysis

A resin consists of several kinds of molecules-moieties, and each moiety has its own repeating unit number represented by an integer of n. A GPC chart shows the distribution of moieties in a resin. The content of each moiety is expressed by the height of each peak and so on.

The condition of gel permeation chromatography two columns; trade name: G4000HXL+G2500HXL+G2000HXL available from Tosoh Corporation;
eluent:tetrahydrofuran (5) Water Absorption Rate and Relative Water Absorption Rate The water absorption of each cured product was determined under boiling at 100° C./2 hours.

The water absorption is defined by the following formula: [(cured product's weight after absorption −cured product's weight prior to water absorption)/(cured product's weight prior to water absorption)]×100.

Relative water absorption herein is a ratio of the water absorption of each sample to that of the sample prepared in comparative example 2.

Preparation of Phenol Aralkyl Resins

Preparation Example 1

Phenol (904.3 g, 9.64 moles), methanol (31.8 g) and diethylsulfuric acid (0.853 g) were introduced into a reactor equipped with a condenser through which cooling water maintained at 70° C. was circulated and the temperature of the mixture was raised in an oil bath with stirring. The introduction of α,α'-dimethoxy-p-xylene was started when the temperature of the liquid in the reactor reached 140° C. After continuous introduction of 800 g (4.81 moles) of α,α'-dimethoxy-p-xylene over 4 hours, the reaction mixture was ripened at 140° C. for additional 90 minutes. The temperature was raised up to 160° C. under reduced pressure to remove unreacted phenol and thus obtain 1025 g of phenol aralkyl resin.

Preparation Example 2

Phenol (1582 g, 16.84 moles), methanol (31.8 g) and diethylsulfuric acid (0,853 g) were introduced into a reactor equipped with a condenser through which cooling water maintained at 70° C. was circulated and the temperature of the mixture was raised in an oil bath with stirring. The introduction of α,α'-dimethoxy-p-xylene was started when the temperature of the liquid in the reactor reached 140° C. After continuous introduction of 800 g (4.81 moles) of α,α'-dimethoxy-p-xylene over 4 hours, the reaction mixture was ripened at 140° C. for additional 90 minutes. The temperature was raised up to 160° C. under reduced pressure to remove unreacted phenol and thus obtain 1008 g of phenol aralkyl resin.

Preparation of Novolak Type Phenol Resin

Preparation Example 3

A 5,000 ml volume reactor equipped with a stirring machine, a temperature-controlling device, a reflux condenser, a total condenser, a pressure reducing device was charged with 2,000 g of phenol and 1,150 g of 37% aqueous solution of formalin, followed by sufficient mixing of the constituents, addition of 5.6 g of oxalic acid dihydrate and condensation reaction thereof at 70° C. for 4 hours. The reaction mixture was heated up to 160° C. at atmospheric pressure to remove water and a small amount of phenol, and further heated up to 170° C. at 20 mm Hg to remove unreacted phenol. The mixture was subjected to distillation by heating to a final temperature of 220° C. at a final pressure of 3 mm Hg in a device with McMahon packing having a diameter of 15 mm and a height of 20 mm, and a novolak type phenol resin was obtained as a bottom product.

Preparation of Phenol Aralkyl Resins

Example 1

A 1,000 ml volume, 4-necked separable flask equipped with a stirring machine, a thermometer, a cooler and a dropping funnel, was charged with 360 g of isopropanol as a reaction solvent and 103 g of phenol aralkyl resin in preparation example 1. After dissolution of the phenol aralkyl resin, 45.6 g of potassium hydroxide was charged and the resulting mixture was stirred to be equal. Into the mixture was dropped 56.7 g of allyl chloride over 10 minutes. The reaction mixture was stirred at 40° C. for 1 hour and additionally stirred at 70° C. for 5 hours to complete allyletherification reaction.

The reaction mixture was filtrated to remove potassium chloride as a by-product, and isopropanol was removed and recovered. The residue was dissolved in ethyl acetate and the solution was washed with water. Ethyl acetate was removed to obtain an allyletherificated phenol aralkyl resin. An absorption peak resulting from the ether bond was measured in the neighborhood of 1,100 $cm^{-1}$ but an absorption peak resulting from the phenolic hydroxy group was scarcely measured in the neighborhood of 3,400 $cm^{-1}$, according to the IR analysis result of the allyletherificated phenol aralkyl resin. An absorption peak of the carbon-carbon double bond resulting from the allyl group was measured in the neighborhood of 1,640 $cm^{-1}$. The fact showed that the product was an allyleterificated compound.

FIG. 1 is an IR analysis chart of the obtained allyletherificated phenol aralkyl resin.

Figure 2:
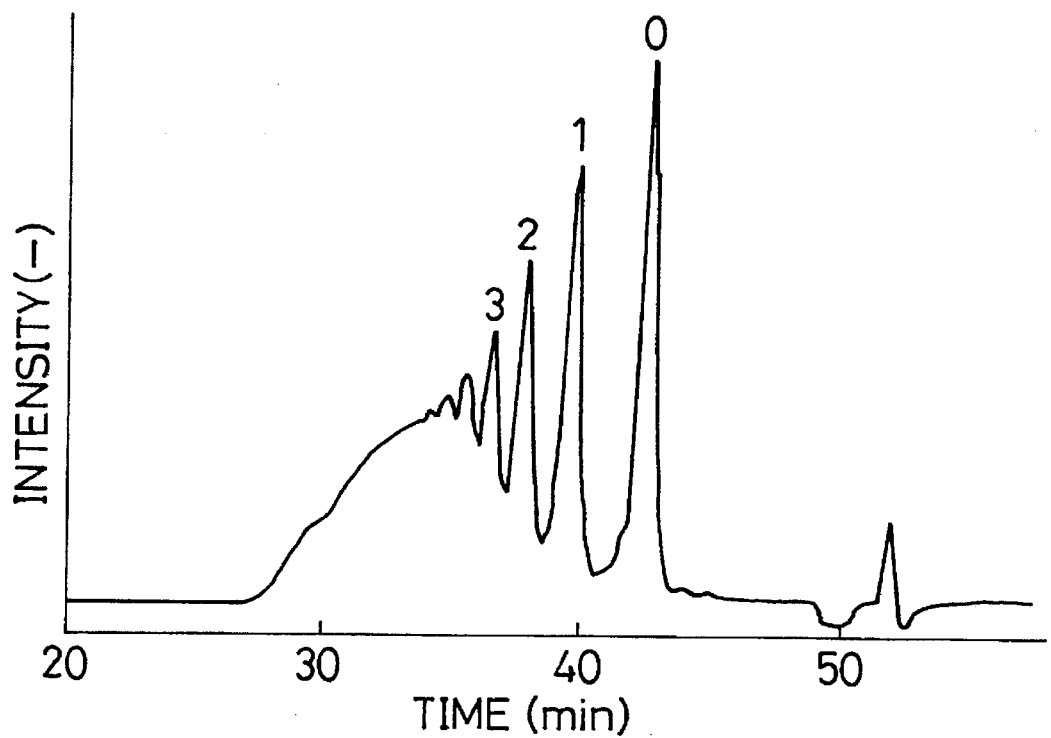
FIG. 2 is a GPC chart showing the distribution of moieties present in the allyletherificated phenol aralkyl resin in example 1.

FIG. 2 is a GPC chart showing the distribution of moieties present in the allyletherificated phenol aralkyl resin.

A 300 ml volume separable flask was charged with 120 g of the allyletherificated phenol aralkyl resin. The resin was heated up to 195° C. and stirred for 5 hours to carry out heat rearrangement in order to obtain an allylated phenol aralkyl resin (yield 98%). An absorption peak resulting from the ether bond was not found, but there was a marked increase due to the absorption resulting from the phenolic hydroxy group, compared with the IR analysis result of the allyletherificated phenol aralkyl resin, according to the IR analysis result of the obtained resin. This fact showed that the allylated phenol aralkyl resin was prepared through heat rearrangement of the allyl group of the allyletherificated phenol aralkyl resin. The melt viscosity of the resin is in Table 1.

Figure 3:
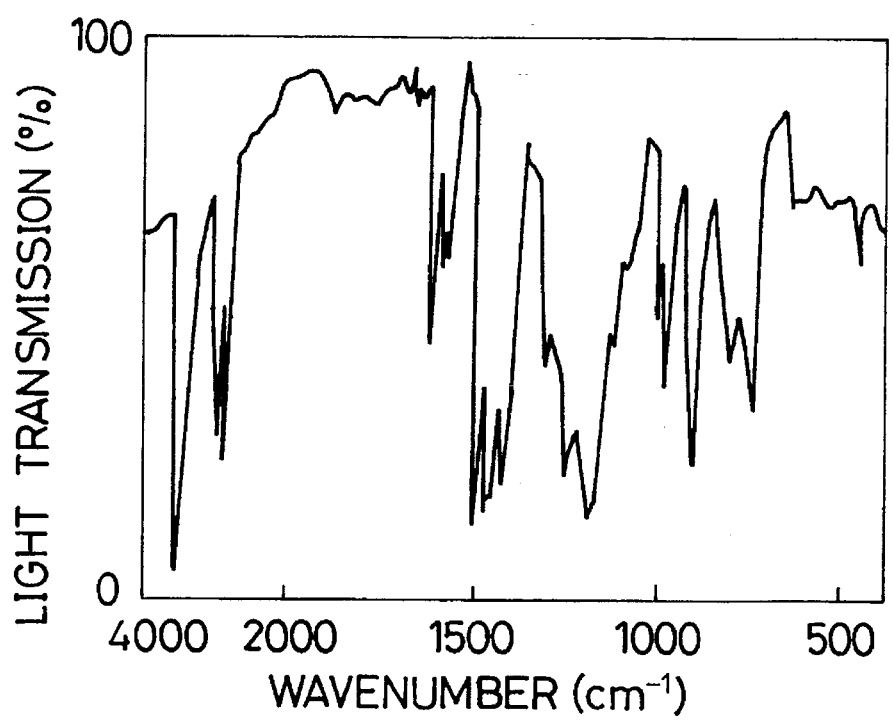
FIG. 3 is an infrared absorption spectrum of the allylated phenol aralkyl resin in example 1.

FIG. 3 is an IR analysis chart of the obtained allylated phenol aralkyl resin.

Figure 4:
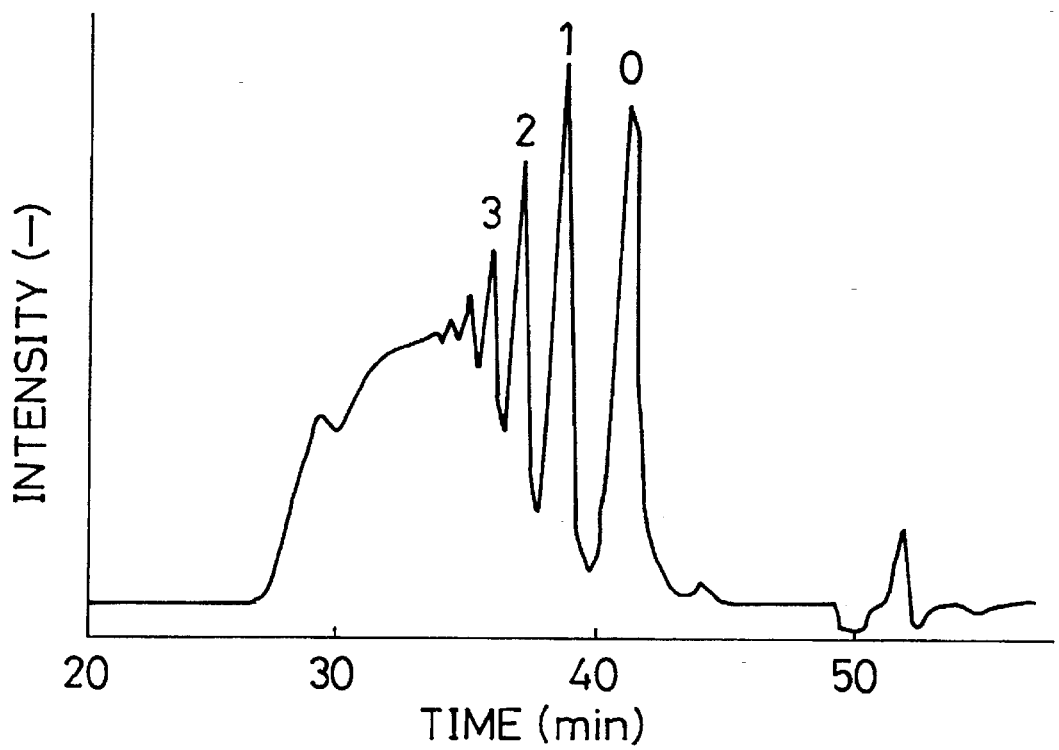
FIG. 4 is a GPC chart showing the distribution of moieties present in the allylated phenol aralkyl resin in example 1.

FIG. 4 is a GPC chart showing the distribution of moieties present in the allylated phenol aralkyl resin.

Comparative Example 1

A phenol aralkyl resin in preparation example 2

Comparative Example 2

The same 1,000 ml volume, 4-necked separable flask equipped with a stirring machine, a thermometer, a cooler and a dropping funnel as that used in the example was charged with 320 g of isopropanol as a reaction solvent and 106 g of novolak type phenol resin in preparation example 3. The allyletherification reaction was carried out under the same condition as in the example to obtain an allyletherificated novolak type phenol resin. A 300 ml volume, separable flask was charged with 130 g of the allyletherificated novolak type phenol resin to obtain an allylated phenol resin according to the same procedure of the example (yield 96%). The melt viscosity of the resin is in Table 1. Obtained was an IR analysis chart similar to that in example 1. The chart showed that there was a large absorption peak resulting from the phenolic hydroxy group and scarcely an absorption peak resulting from the ether bond. This fact showed that an allyletherificated product was changed into an allylated product through heat rearrangement of the allyl group.

Preparation of Epoxy Cured Products

An epoxy resin, a curing accelerator and each of the phenol resins prepared in example 1 and comparative examples 1 to 2 as curing agents were dissolved in a feasible minimum amount of acetone and the mixture was formed into a cast resin plate which had a thickness of about 2 mm to obtain a sample for property-evaluation. The relative amounts of the epoxy resin, the curing agent and the curing accelerator were set at 100:49:1 parts by weight, respectively.

The epoxy resin used as the principal constituent was epoxy resin (EOCN-102S, available from Nippon Kayaku Co.) and triphenylphosphine (TPP) was used as a curing accelerator. Curing was carried out at 175° C. for 5 hours.

The Tg values of the cured products are in Table 1.

TABLE 1

|  | Example | Comparative Example | |
| --- | --- | --- | --- |
|  | 1 | 1 | 2 |
| Melt viscosity (poise) | 18.1 | 60.5 | 17.8 |
| Curing conditions (°C. × hr) | 175 × 5 | 175 × 5 | 175 × 5 |
| Cured products' Tg (°C.) | 147 | 145 | 148 |

TABLE 1-continued

|  | Example | Comparative Example | |
| --- | --- | --- | --- |
|  | 1 | 1 | 2 |
| Water absorption (wt %) | 0.39 | 0.44 | 0.52 |
| Relative water absorption (−) | 0.76 | 0.86 | 1.00 |

Notes:
Resin in Example 1: an allylated phenol aralkyl resin of the present invention
Resin in Comparative Example 1: a phenol arakyl resin obtained in Preparation Example 2
Resin in Comparative Example 2: an allylated novolak type phenol resin obtained in Preparation Example 3
Melt viscosity: the melt viscosity of a resin
Curing conditions: the curing conditions for obtaining an epoxy cured product Notes:

Resin in Example 1: an allylated phenol aralkyl resin of the present invention

Resin in Comparative Example 1: a phenol aralkyl resin obtained in Preparation Example 2

Resin in Comparative Example 2: an allylated novolak type phenol resin obtained in Preparation Example 3

Melt viscosity: the melt viscosity of a resin

Curing conditions: the curing conditions for obtaining an epoxy cured product

What is claimed is:

1. An allylated phenol aralkyl resin represented by the general formula (2),

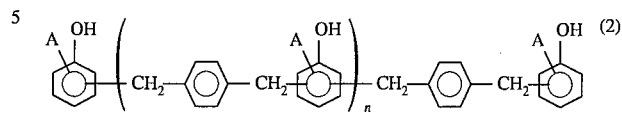

wherein n is an integer of from 0 to 10 and A is an allyl group.

2. A process for preparing an allylated phenol aralkyl resin as claimed in claim 1 which comprises reacting an allyl halide with a phenol aralkyl resin represented by the general formula (3),

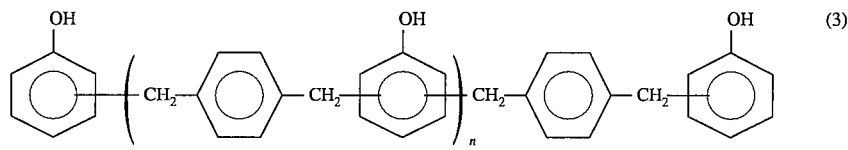

wherein n is an integer of from 0 to 10, in the presence of a base in an organic solvent to obtain an allyletherificated phenol aralkyl resin, and changing the allyletherificated phenol aralkyl resin through Claisen rearrangement.

3. A process for preparing an allylated phenol aralkyl resin as claimed in claim 2, wherein the Claisen rearrangement is carried out at a temperature of from 160° to 250° C.

* * * * *